(12) United States Patent
Crutcher et al.

(10) Patent No.: US 6,310,941 B1
(45) Date of Patent: *Oct. 30, 2001

(54) METHOD AND APPARATUS FOR FACILITATING TIERED COLLABORATION

(75) Inventors: Paul D. Crutcher; Jeffrey B. Sponaugle; Al J. Simon, all of Hillsboro; Jason L. Cassezza, Tigard; Mojtaba Mirashrafi, Portland; Kenneth L. Keeler, Hillsboro; Ajit B. Pendse, Portland, all of OR (US)

(73) Assignee: ITXC, Inc., Beaverton, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,400

(22) Filed: Aug. 6, 1998

Related U.S. Application Data

(63) Continuation-in-part of application No. 08/818,321, filed on Mar. 14, 1997, which is a continuation-in-part of application No. 08/818,741, filed on Mar. 14, 1997.

(51) Int. Cl.[7] .......................... H04M 1/64; H04M 3/42; H04M 3/00; H04L 12/50; H04L 12/28

(52) U.S. Cl. ........................... 379/88.17; 379/88.13; 379/201; 379/265; 379/900; 379/908; 370/352; 370/389

(58) Field of Search ................. 379/67.1, 88.13, 379/88.17, 93.08, 93.21, 93.25, 201, 202, 268, 269, 270, 272, 273, 142, 216, 265, 900, 908; 370/351, 389, 466, 468, 40, 352; 348/6, 7, 12, 13; 709/201–203, 204–227

(56) References Cited

U.S. PATENT DOCUMENTS

| 5,046,079 | * | 9/1991 | Hashimoto | 379/53 |
| 5,583,920 | * | 12/1996 | Wheeler, Jr. | 379/88 |
| 5,604,737 | * | 2/1997 | Iwami et al. | 370/352 |
| 5,608,446 | * | 3/1997 | Carr et al. | 348/6 |
| 5,610,910 | * | 3/1997 | Focsaneanu et al. | 370/351 |
| 5,729,594 | * | 3/1998 | Klingman | 379/93.12 |
| 5,742,670 | * | 4/1998 | Bennett | 379/142 |
| 5,884,032 | * | 3/1999 | Bateman et al. | 709/204 |
| 5,917,817 | * | 6/1999 | Dunn et al. | 370/352 |
| 5,926,535 | * | 7/1999 | Reynolds | 379/221 |
| 5,995,606 | * | 11/1999 | Civinlar et al. | 379/201 |

\* cited by examiner

Primary Examiner—Allan Hoosain
(74) Attorney, Agent, or Firm—Columbia IP Law Group, PC

(57) ABSTRACT

An apparatus comprising a storage medium having stored therein a plurality of programming instructions and an execution unit is presented. The execution unit, coupled to the storage medium, executes the plurality of programming instructions to implement a hierarchy of collaboration services enabling collaboration between a client computer and a collaboration partner, including a service to determine the system attributes of the client computer and to select an appropriate collaboration service from the hierarchy of collaboration services commensurate with the determined system attributes of the client computer and enabling a collaboration session between the client computer and the collaboration partner.

35 Claims, 9 Drawing Sheets

METHOD AND APPARATUS FOR FACILITATING TIERED COLLABORATION

RELATED APPLICATIONS

This application is a continuation-in-part of copending application Ser. No. 08/818,321 entitled "Method and Apparatus for Establishing and Facilitating a Direct Quality Voice Call to a Telephone Extension on Behalf of a Client Computer" to Mojtaba Mirashrafi, et al.; and copending application Ser. No. 08/818,741 entitled "Method and Apparatus for Synchronizing Information Browsing Among Multiple Systems" to Mojtaba Mirashrafi, et al., both of which are commonly assigned to the assignee of the present application.

BACKGROUND OF THE INVENTION

1. Field of the Invention

The present invention relates to the field of telecommunications and, in particular, to a method and apparatus for facilitating tiered collaboration.

2. Background Information

Numerous advances have been made in recent years in the field of telecommunications. One example of these numerous advances in communications is the emerging field of computer telephony via the internet. In particular, the field of internet telephony has emerged as a viable technology that is evolving at an ever increasing rate. Evidence of this evolution of internet telephony is best characterized by the number of new products recently become available in the market. Products such as CoolTalk by Netscape Communications Corporation of Mountain View, Calif.; Internet Connection Phone by International Business Machines of Amonk, N.Y.; Intel Internet Phone (IPhone) by Intel Corporation of Santa Clara, Calif.; NetMeeting by Microsoft Corporation, Redmond, Wash.; Quarterdeck WebTalk by Quarterdeck Corporation of Marina Del Rey, Calif.; TeleVox by Voxware Incorporated of Princeton, N.J.; and WebPhone by Netspeak Corporation of Boca Raton, Fla., are representative of the current state of applications facilitating interent telephony.

Each of these products offers internet based voice communications with a telephone motif, between two users each using the same (or compatible) product on either end of the internet connection. That is, the internet provides the "switching" architecture for the communication system, while the computer acts as the audio interface (e.g., the "handset"). One reason for the proliferation of these applications is a desire to push the technology of the internet to provide a total communications tool. The appeal to users is that, currently, the use of the internet is free of toll charges. Therefore, currently, a user of an internet phone product may communicate with another user located anywhere else in the world without having to pay the long distance charges associated with making a telephone call using the public switched telephone network (PSTN), so long as each of the users has a computer that is appropriately configured to provide such communications.

Although innovative in their own right, the current internet based telephony applications identified above have a number of limitations which retard their acceptance as a primary communications tool. One such limitation is that many of the applications identified above require that both users have installed the same software package, or compatible packages and, therefore, provide a relatively low level of interoperability. One reason for this lack of interoperability between internet telephony applications is that the developers of many of these products have incorporated different voice encoders (commonly referred to as a "voice codec", or simply a "codec" by those in the telecommunication arts) in the products. Consequently, as a result of the different codecs used, many internet telephony applications are unable to recognize speech encoded (i.e., digitized) by a codec of a disimilar application.

This problem is alleviated for those products that are upgraded to comply with emerging telephony standards, such as International Telecommunication Union's (ITU) H.323 standard. However, other limitations remain. For example, another limitation associated with many of these products is that they are tied to the internet, often requiring all users to access a common server in order to maintain a directory of available users in which to call. That is to say, many of the applications identified above do not integrate the packet switched network of the internet with the circuit switched public switched telephone network (PSTN). Therefore, although a computer connected to the internet may communicate with another user on the internet, assuming they are both using a common software application (or at least applications with compatible codecs), these applications do not support communication with a user of a Telephone handset.

The reason for this limitation is readily understood by those who appreciate the complexity of the two networks. As alluded to above, the internet is a packet switched network. That is to say, communication over the internet is accomplished by "breaking" the transmitted data into varying-sized packages (or "packets"), based primarily on communication content, and interleaving the various-sized packages to best utilize the bandwidth available at any given time on the internet. When the packets reach their intended destination, they must be reassembled into the originally transmitted data. Loss of packets, and thus data, occur frequently in such a network, and the ability of the network to successfully transmit information from one point in the network to another determines the quality of the network. For inter-computer communication transactions involving non real-time data, the ability to transmit packets and retransmit any packets that are perceived to have been dropped is not a severe limitation and may not even be perceived by the user of the system. However, in a voice communication transaction, the delay required to retransmit even one data packet may be perceived by a user. At best, such delays are an annoying inconvenience. In practice, the delays actually can become intolerable, as the cumulative latency adds up with successive transmissions.

In contrast to the packet switched network of the internet, the public switched telephone network (PSTN) is a circuit switched network. That is to say that the PSTN assigns a dedicated communication line to a user with which to complete the telephone call, wherein the user can utilize the assigned resource of the PSTN in any way they choose, with the understanding that the user is paying for the use of the dedicated resource of the PSTN. While the circuit switched approach of the PSTN system is not necessarily the most efficient system in terms of call traffic (i.e., it does not make use of the "dead space" common in a conversation), it is relatively easy to ensure that information destined for a particular user is delivered, it simply provides a dedicated line to complete the transaction.

Nonetheless, despite these engineering challanges, a few products have emerged which purport to integrate the PSTN to the internet. Products such as Net2Phone by IDT Corporation of Hackensack, N.J., claim to provide a computer user with the ability to place and receive a phone call to/from a PSTN extension. Unfortunately, none of these products completely solve the problem of integrating the two networks. The limitations perhaps best characterized by way of an example communication session. With these prior art internet telephony applications, a user of an internet telephony enabled client computer initiating a telephone call to a Telephone handset launches the collaboration session from the client computer by accessing a server (the primary access server), operated by the developer of the internet telephony application that supports internet telecommunications. As the initiator accesses the primary access server, he/she is prompted for a destination address, which takes the form of a PSTN telephone number for an outgoing call to a Telephone handset. Having provided the primary access server with the PSTN telephone number associated with the Telephone handset, the primary server somehow determines[1] which server in a community of similarly enabled servers (i.e., servers with the hardware/software necessary to provide access to the PSTN) is closest to the destination address, and completes the telephone call by routing the telephone call through a number of intermediate servers on the internet to the selected server, which will actually place the collaboration session to the Telephone handset on behalf of the client computer, facilitating the collaboration session between the client computer and the Telephone handset. In other words, the user of the client computer is required to have prior knowledge of the destination phone number, which is limiting in many circumstances. For example, in a situation where the user of the client computer is engaged in a data communication session involving a webpage for a corporate entity, the user may wish to speak with someone in a "local office" of the corporate entity. Prior art internet telephony applications require that the telephone number for the "local office" of the corporate entity be provided by the user of the client computer in order to place the telephone call. If the telephone number for the "local office" of the corporate entity is not provided by the webpage, the user of client computer must look it up or have prior knowledge of it.

[1] The manner in which the "primary access server" determines the "call originating server" is not known.

Additionally, while the prior art approach of simply finding the internet telephony enabled server closest to the destination address may offer the simplest technical solution and a seemingly cheaper connection, it does not ensure the quality of the voice connection. One skilled in the art will appreciate that there are a number of characteristics which may impact the quality of the voice connection. For example, insofar as the internet is a packet switched network, as the number of intermediate routers required to interface the client computer to the selected server increases so, too, does the likelihood that data packets containing voice information could be lost or corrupted. The result of lost or corrupted data packets is broken or garbled speech. Another factor affecting internet telephony communication performance is the bandwidth available on the selected server. If, for example, the selected server is very busy handling a number of other processes, the performance associated with each of the processes begins to degrade (i.e., slow down), which may also result in delayed delivery of data packets containing speech, which in turn results in user perception of poor quality.

Those skilled in the art will appreciate that in order to take advantage of prior art internet telephony systems, a client computer system must be appropriately endowed with the proper input/output (I/O) components (sometimes referred to as "peripherals"). Speakers, an audio sound board and a microphone are but a few examples of the components necessary to place and receive audio phone calls over the internet using ones computer. Many of the newer computer's sold today have this hardware pre-installed as a part of a system "bundle". However, many of the low-end entry level systems may not have audio/video (a/v) input/output (I/O) equipment included in its system "bundle", in an effort to keep the cost of the system down. Moreover, a number of the older computers did not have audio/video components included in the system when sold, so unless the end-user has since added that equipment, many of the older computers in service may not have the equipment necessary to take advantage of the prior art internet telephony services.

Thus, a need exists for a method and apparatus for facilitating tiered collaboration commensurate with the system attributes of the client computer that is unencumbered by the limitations associated with the prior art.

SUMMARY OF THE INVENTION

In accordance with the teachings of the present invention, a method and apparatus for facilitating tiered collaboration is disclosed. In one embodiment, for example, an apparatus comprising a storage medium having stored therein a plurality of programming instructions and an execution unit is presented. The execution unit, coupled to the storage medium, executes the plurality of programming instructions to implement a hierarchy of collaboration services enabling collaboration between a client computer and a collaboration partner, including a service to determine the system attributes of the client computer and to select an appropriate collaboration service from-the hierarchy of collaboration services commensurate with the determined system attributes of the client computer and enabling a collaboration session between the client computer and the collaboration partner.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Figure 1:
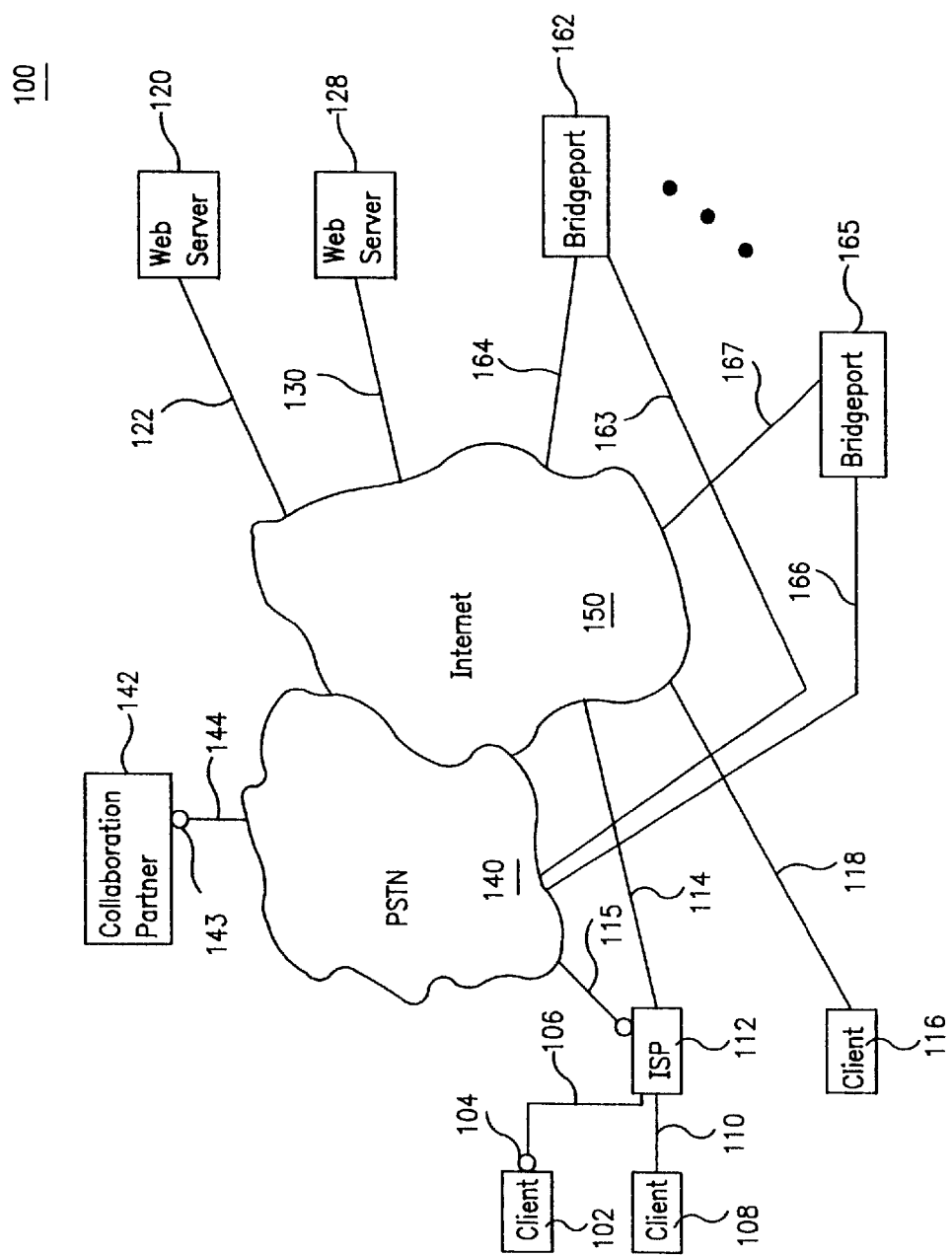
FIG. 1 is a block diagram illustrating one example of a communication system incorporating the teachings of the present invention.

Referring now to FIG. 1, a block diagram is presented illustrating one example of communication system 100 incorporating the teachings of the present invention for establishing and facilitating a collaboration session between a user of a client computer and a collaboration partner, wherein the collaboration service employed is commensurate with the automatically ascertained system attributes of the client computer. That is to say, the present invention provides a method and apparatus enabling a collaboration session between a client computer and a collaboration partner, wherein the collaboration service is chosen from a hierarchy of collaboration services, commensurate with the identified system attributes of the client computer. Although the present invention will be described in the context of this exemplary computer system, based on the descriptions to follow, those skilled in the art will appreciate that the present invention is not limited to this embodiment, and may also be practiced within an intranet (in lieu of the internet) and/or automated/computerized telephony answering equipment (in lieu of telephone handsets).

In one embodiment of the present invention, client computer 102, while in data communication with a web server, e.g. web server 128, through PSTN 140 and Internet 150, is presented with a Push-To-Collaborate™[2] option by web server 128. As will be described in greater detail below, in accordance with one embodiment of the present invention, when the user of client computer 102 selects the Push-To-Collaborate™ option, a server incorporated with the teachings of the present invention (e.g., bridgeport 162) automatically determines the system attributes of the requesting client computer (e.g., client computer 102), an appropriate collaboration partner (e.g., collaboration partner 142) and selects an appropriate collaboration service from a hierarchy of collaboration services that is commensurate with the system attributes of the client computer and the collaboration partner.

[2] Push-To-Collaborate is a trademark of eFusion, Inc. of Beaverton, Oreg.

In conjunction with determining the system attributes of the collaboration partner, bridgeport 162 automatically determines an appropriate network medium through which to establish the collaboration session. For example, as will be described in greater detail below, the transmission requirements (e.g., bandwidth, latency, and the like) of certain collaboration services, e.g., video collaboration services and audio collaboration services lend themselves well to a network providing a guaranteed quality of service (QoS), e.g., a circuit switched network, whereas other collaboration services, e.g., text collaboration services, do not have the same QoS constraints and may well use the packet switched network to accommodate the collaboration session. Therefore, if an audio telephony collaboration service or a video telephony collaboration service is selected, utilizing both the packet switched network and the circuit switched network, bridgeport 162 automatically determines an appropriate destination extension (e.g., a phone number) within the circuit switched network of collaboration partner 142, to accommodate the selected collaboration service. Similarly, if a text collaboration service (e.g., a "chat session") is selected utilizing the packet switched network, bridgeport 162 determines an appropriate destination extension (e.g., Internet Protocol (IP) address) within the packet switched network associated with collaboration partner 142, to accommodate the selected collaboration service. Alternatively, bridgeport 162 may elect to establish the text collaboration service using the circuit switched network, and therefore determines an appropriate destination extension (e.g., phone number) within the circuit switched network for collaboration partner 142 to accommodate the selected collaboration service. It will be understood by those skilled in the art, however, that any of the collaboration services described herein may well utilize the packet switched network, the circuit switched network, or a combination of the two.

In the instance where the collaboration session spans both the circuit switched network and the packet switched network, e.g., bridgeport 162 is going to route the connection off of Internet 150 to a network extension of the circuit switched network (PSTN 140), bridgeport 162 selects an appropriate one of a "community" of internet/PSTN changeover servers (e.g., bridgeports 162 and 165) to establish and facilitate a connection with circuit switched network extension 143 facilitating the collaboration session between the user of client computer 102 and the collaboration partner 142. In the context of the example embodiment, for differentiation and ease of explanation, bridgeport 162 will be referred to as a page bridgeport, while the selected internet/PSTN changeover server will be referred to as a changeover bridgeport.

In one embodiment, the Push-To-Collaborate™ option is pre-associated with page bridgeport 162 by web server 128, and the determination of the destination circuit switched network extension by page bridgeport 162 is made in accordance with one or more attributes of web server 128, such as the identity of web server 128, and optionally, one or more system attributes of client computer 102, such as the operating system type and versions, processor type, internet browser type and version, multimedia support, and the like. In addition, page bridgeport 162 may also take other factors into account such as, for example, the zip code of the geographic area client computer 102 is located. In an alternate embodiment, page bridgeport 162 is not pre-associated with the Push-To-Collaborate™ option, but rather is selected dynamically by web server 128.

Client computer 102, web servers 120 and 128, bridgeports 162 and 165, and collaboration partner 142 are communicatively coupled to each other by way of a circuit switched network, e.g., PSTN 140 and Internet 150 as shown. More specifically, client computer 102 is coupled to Internet 150 by way of a direct connection (e.g., a direct PSTN telephony connection, a direct wireless telephony connection, etc.) to internet service provider (ISP) 112. Client computer 102 is coupled to ISP 112 through PSTN extension 104, communication line 106 and PSTN 140. In other words, for the illustrated embodiment, client computer 102 includes a modulation/demodulation (MODEM) device (not shown) coupled to PSTN extension 104. However, a client computer may be coupled to ISP 112 through a network connection using a network interface instead, such as client computer 108 using network connection 110. Alternatively, a client computer may also be directly coupled to internet 150 such as client computer 116 using direct connection 118.

Web servers 120 and 128 are coupled to internet 150 through connections 122 and 130. Although not illustrated, web servers 120 and 128 may also be coupled to PSTN 140. Similarly, bridgeports 162 and 165 incorporating the teachings of the present invention are coupled to Internet 150 through connections 164 and 167. Bridgeports 162 and 165 are also coupled to PSTN 140 through communication lines 163 and 166 respectively. Collaboration partner 142 is coupled to PSTN 140 through circuit switched network extension 143 and communication line 144.

Communication lines 106, 115 and 144 may simply be plain old telephone service (POTS) communication lines, although other types of communication lines may be used. For example, in the case of communication line 106, it may be an integrated service digital network (ISDN) line, whereas communication line 115 may be a T1 (1.533 Mbps) or an E1 (2.0488 Mbps) trunk line. In the case of communication line 144, it may be a wireless cellular connection, a Personal Communication Services (PCS) connection, and the like.

PSTN 140 includes a number of Service Switching Points (SSP), Signal Transfer Points (STP), and Service Control Points (SCP) coupled to each other (not shown). PSTN extension 104 through communication line 106 is coupled to a "local" SSP, which in turn is coupled to a number of other "local" PSTN extensions, including e.g. PSTN extension 113 if ISP 112 is a "local" ISP served by the same SSP. In addition, the "local" SSP is also coupled to an associated STP, which in turn is coupled to other "remote" SSPs. Each of the "remote" SSPs is coupled to a number of "remote" PSTN extensions, including e.g. extension 143, if collaboration partner 142 is a "remote" terminal served by a "remote" SSP. As is well known in the art, Internet 150 includes a number of networks interconnected by routers, interconnecting the various client computers, web servers and bridgeports together. [As described earlier, Internet 150 may well be a private intranet instead.]

Except for the incorporated teachings of the present invention (to be more fully described below), client computer 102 is intended to represent a broad category of computer systems known in the art. An example of such a computer system is a desktop computer system equipped with a high performance microprocessor, such as the Pentium® processor manufactured by Intel Corporation of Santa Clara, Calif. or the Alpha® processor manufactured by Digital Equipment Corporation of Manard, Mass.; a number of audio input and output peripherals/interface for inputting, digitizing and compressing outbound audio, and for decompressing and rendering inbound audio; a communication interface for sending and receiving various data packets (including audio data packets) in accordance with certain standard communication protocol, such as a V.42bis compliant modem or an Ethernet adapter card; a windows-based operating system including Internetworking communication services providing support for Transmission Control Protocol/Internet Protocol (TCP/IP) (and other Internet Communication Suite protocols) and socket services, such as Windows™ 95 ("Win95") developed by Microsoft Corporation of Redmond, Wash.; a web communications tool such as Navigator™, developed by Netscape Communications of Mountain View, Calif.; and an Internet telephony application, such as the above described IPhone™[3] developed by Intel Corporation.

≠[3] Note that it is not necessary for the internet telephony application to explicitly support voice calls with telephone handsets, as is the case with IPhone and many of the prior art internet telephony applications.

In one embodiment, the teachings of the present invention are incorporated in client computer 102 in the form of a client application. In one embodiment, the application is a "bridgeport driver". The bridgeport driver may be made available to client computer 102 through a number of alternate means. For example, the bridgeport driver may be distributed via diskettes produced by a bridgeport vendor, or downloaded from a web server of the bridgeport vendor. In other embodiments, the teachings of the present invention are incorporated in the browser and/or the operating system (OS) of client computer 102. For ease of understanding, the remaining descriptions will be presented in the context of the bridgeport driver embodiment.

Except for the presentation of webpages having Push-To-Collaborate™ options pre-associated with the bridgeports of the present invention, web servers 120 and 128 are intended to represent a broad category of web servers, including e.g. corporate presence servers and government presence servers, known in the art. Any number of high performance computer servers may be employed as web servers 120 and 128, e.g. a computer server equipped with one or more Pentium® Pro processors from Intel Corp., running Mircrosoft's Windows® NT operating system, or a computer server equipped with one or more SPARC® processors from Sun Microsystems of Mountain View, Calif., running Sun's Solaris® operating system.

Similarly, ISP 112 is intended to represent a broad category of Internet service providers. An ISP may be a "small" local Internet access provider, or one of a number of point of presence providers offered by a "large" ISP. It is also anticipated that ISP 112 may be incorporated within an SSP of PSTN 140. As described herein, collaboration partner 142 is intended to represent a broad category of communication devices known in the art, including but not limited to wireline telephone handsets, cordless telephone handsets, wireless telephone handsets, computer terminals, automated call distribution devices, video phones, and the like.

Before proceeding to describe bridgeports 162 and 165 in further detail, it should be noted that one skilled in the art of, for example, telecommunications, will appreciate that the communication system illustrated in FIG. 1, is significantly more complex than that which is depicted. For example, each SSP of PSTN 140 may service thousands of PSTN extensions, and there are numerous SSPs, STPs and SCPs in a common PSTN implementation. Internet 150 includes well over several hundred thousand networks. Together, PSTN 140 and Internet 150 interconnect millions of client computers and web servers. Further, those skilled in the art will appreciate that Internet 150 is but an Internetworked combination of a wide variety of packet switched networks and, thus, is representative of a wide variety of packet switched network technologies including Integrated Services Digital Network (ISDN), Asynchronous Transfer Mode (ATM), Ethernet, and the like. Similarly, Public Switched Telephone Network (PSTN) is representative of a wide variety of wireline and wireless circuit switched network technologies, including time division multiple access, frequency division multiple access, and other circuit switched technologies.

Nonetheless, FIG. 1 does capture a number of the more relevant components of a communication system necessary to illustrate the interrelationship between client computer 102, web server 128, bridgeports 162 and 165, and collaboration partner 142, such that one skilled in the art may practice the present invention. Also, while the present invention is being described in the context of client computer 102 being engaged in data communication with web server 128, as will be readily apparent from the description to follow, the present invention may be practiced with any "client" computer engaged in data communication with any "web" or "info" server.

Figure 2:
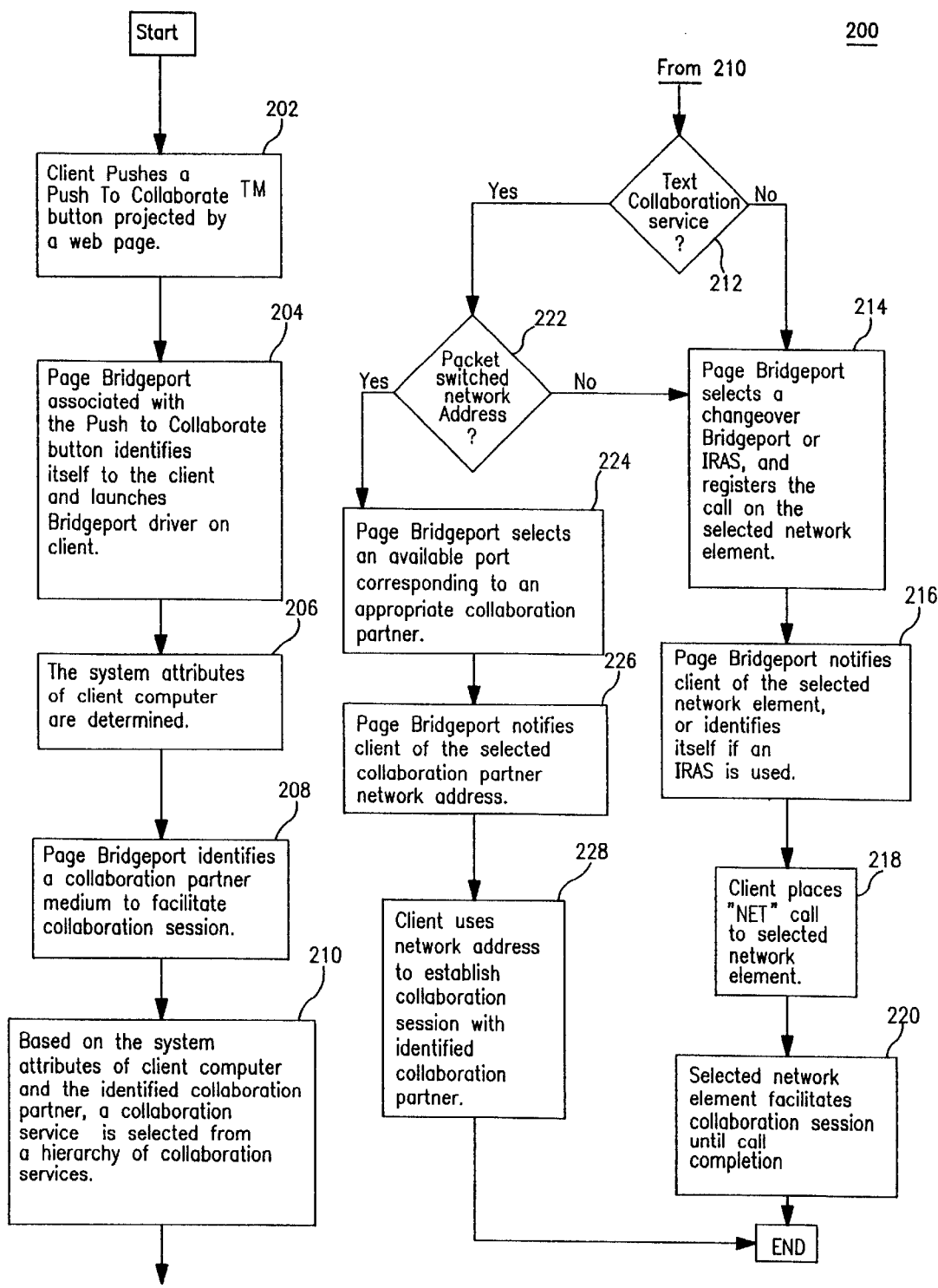
FIG. 2 is a flow chart illustrating one example embodiment of a method for enabling a collaboration session between a client computer and a collaboration partner, in accordance with the teachings of the present invention.

Turning now to FIG. 2, a flow chart illustrating one embodiment of the method steps of the present invention for enabling collaboration services between a networked client computer and a collaboration partner is shown. For ease of explanation, the method of FIGS. 2–4 will be developed in the context of an example implementation, wherein a user of client computer 102 is engaged in a data communication session involving a webpage, projected by web server 128, which incorporates a Push-To-Collaborate™ feature wherein the user of the webpage may "push" a displayed Push-To-Collaborate™ button to initiate a collaboration session with a local office, retail center and the like, associated with the web server, enabling the user of client computer 102 to collaborate with a user of a network endpoint (e.g., collaboration partner 142) located at the "local office". Those skilled in the art will appreciate that the terms "push" and "pushing" are metaphoric descriptions of the action taken by a user. The action is in actuality accomplished, e.g., by the user clicking a mouse button, upon moving a cursor over the displayed Push-To-Collaborate™ button.

With reference to FIG. 2, the method begins at step 202 with a user of client computer 102 "pushing" the Push-To-Collaborate™ button projected with the webpage. As described earlier, the Push-To-Collaborate™ button is pre-associated with a bridgeport, e.g. page bridgeport 162. In one embodiment, the pre-association is accomplished via HyperText Markup Language (HTML) elements embedded in the webpage, identifying the Uniform Resource Locator (URL) of page bridgeport 162. The HTML elements further specify that a Push-To-Collaborate™ event notice including the URL of web server 128 is to be posted to page bridgeport 162. Thus, in response to the user's "pushing" of the Push-To-Collaborate™ button, a HyperText Transmission Protocol (HTTP) connection is temporarily established between client computer 102 and page bridgeport 162, and a message posting the Push-To-Collaborate™ event is sent to page bridgeport 162.

For the illustrated embodiment, in response to the Push-To-Collaborate™ event notification, page bridgeport 162 identifies itself to client computer 102, providing client computer 102 with its Internet Protocol (IP) address, step 204. The HTTP connection is closed upon sending the return data to client computer 102 by page bridgeport 162. In an alternate embodiment, the HTTP connection is held open after sending the return data to client computer 102. In one embodiment, the identification and provision of page bridgeport's IP address also includes identification that the information is associated with a Push-To-Collaborate™ button projected by web server 128. More specifically, the URL of web server 128 is also returned to client computer 102. For the illustrated embodiment, the returned data also includes a command for starting up the client bridgeport driver on client computer 102.

Next, in accordance with the illustrated embodiment of FIG. 2, the system attributes of client computer 102 are determined, in order to select an appropriate collaboration service from a hierarchy of collaboration services, step 206. In one embodiment, for example, page bridgeport 162 issues a query, e.g., a registration inquiry for a computer running the Microsoft® Win95™ operating system, which returns a list of the system attributes of the responding client computer. In alternate embodiments, the necessary system attribute information may be collected from information resident on the client computer at the start-up of the collaboration software, the bridgeport client application software, or by querying the Internet browser application running on the client computer (via a "cookie"). Insofar as such methods are well known in the art, they need not be further described here. Those skilled in the art will appreciate, however, that a direct query of client computer 102 is but one way to determine the system attributes of client computer 102. For example, in an alternate embodiment, page bridgeport 162 downloads and launches an agent which interrogates the input/output ports and bus interfaces of client computer 102 to determine certain attributes of client computer 102, e.g., audio/video input/output (I/O), processor type, operating system type and version, browser type and version, multimedia application support, H.323 facilities, whether the client resides behind a firewall, and the like. Once the agent has determined the I/O peripherals available to client computer 102, the agent returns a list of these system attributes to page bridgeport 162. In yet another embodiment, the identification is performed by the launched client bridgeport driver, by way of another HTTP connection.

In one embodiment of the present invention, the agent is platform independent, meaning that it may be utilized by any of a number of alternative system architectures and operating systems.

In another embodiment, the agent executing on client 102 will collect the necessary information and make the determination of the best communication/collaboration mechanism. Based on the action taken by the agent executing on client 102, bridgeport 162 identifies an appropriate collaboration partner out of the community of collaboration partners.

In accordance with one embodiment, once the system attribute information is received, page bridgeport 162 determines the eligible collaboration partners from a plurality of collaboration partners, their network extensions (e.g., PSTN extension, IP address, etc.), and the level of collaboration services they offer, step 208. That is to say, having identified the system attributes of client computer 102, page bridgeport 162 identifies a collaboration partner capable of accommodating the same level of collaboration services supported by the system attributes of client computer 102. In one embodiment, page bridgeport 162 determines what collaboration services a collaboration partner offers, such as video telephony, audio telephony, or text communications. In one example, the level of collaboration service offered by the eligible collaboration partners through the circuit switched network is differentiated using extension prefixes. Thus, in accordance with this example, a 906 extension is called in order to initiate a video telephony connection, whereas an 806 extension is used to initiate an audio telephony connection. Similarly, the level of collaboration service offered via the packet switched network may be differentiated by HTTP requests, using IP addresses, or URL suffixes. In one embodiment, bridgeport 162 analyzes the HTTP request to determine whether the stream is requesting video collaboration services, audio collaboration services, text chat services, and the like. If, for example, bridgeport 162 received the following request:

HTTP://bridgeport.com/collaborate?/method=audio

The bridgeport residing at "bridgeport.com", e.g., bridgeport 162, would recognize that an audio collaboration session is requested. Similarly, video or text chat collaboration sessions may also be identified.

In another embodiment, rather than waiting for the system attributes of client computer 102 to be ascertained, bridgeport 162 automatically determines eligible collaboration partners from web server 128 corresponding to the web page projected to client computer 102.

In another embodiment, having "pushed" the Push-to-Collaborate™ button projected by a web page, client computer 102 is directed to bridgeport 162 which determines the system attributes of client computer 102, e.g., the computer type, processor type, multimedia support, browser type, whether an internet collaboration application is installed, proxy settings, and whether client 102 resides behind a firewall (which may, in certain embodiments, limit the collaboration session to a text chat collaboration session). In an alternate embodiment, page bridgeport 162 identifies the community of collaboration partners to the user of client computer 102, who then selects the desired collaboration partner. Concurrently, bridgeport 162 accesses webserver 128 for a list of eligible collaboration partners, and the services they offer. Given this culmination of information, bridgeport 162 selects a collaboration partner offering the requisite collaboration services to facilitate the collaboration session.

In yet another embodiment, the determination of collaboration session extension/medium takes into account other attributes of client computer 102, e.g. the zip code in which client computer 102 is located, or the telephone area code/prefix associated with client computer 102. In one embodiment, page bridgeport 162 is equipped with a database having the necessary geographic and extension information for performing the selection based on such information. In an alternate embodiment, page bridgeport 162 is not equipped with such a database, but is equipped with services that access external on-line services (e.g., geographic location services, directory services, etc.) via the packet switched network to make the determination. An example of an on-line geographic location service is MapBlast™, developed by Vicinity Corporation of Palo Alto, Calif.

In association with selecting the collaboration partner extension/medium in step 208, page bridgeport 162 selects an appropriate collaboration service from a hierarchy of collaboration services to facilitate the collaboration session between client computer 102 and the selected destination extension (e.g., extension 143) of the identified collaboration partner (e.g., collaboration partner 142), step 210. In one embodiment of the present invention, the hierarchy of collaboration services ranges from video telephony collaboration services, wherein video, audio and data information are simultaneously exchanged between a client computer and the selected collaboration partner, to a simple text collaboration service, wherein ASCII text is transmitted between client computer 102 and the selected collaboration partner. As alluded to above, the selection of which collaboration service is selected by page bridgeport 162 depends upon the determined system attributes of client computer 102 and the collaboration services available by the collaboration partners associated with the web server/Push-To-Collaborate™ function. One example of a hierarchy of collaboration services, and the requisite system attributes of the client computer are presented below, in Table 1.

TABLE 1

Hierarchy of Collaboration Services

| Level | System Attributes | Collaboration Services Available |
|---|---|---|
| I | digital camera, speaker(s), sound board, microphone, scanner, video board | Video Telephony Collaboration Services; or Still Picture Telephony Collaboration Services |
| II | speaker(s), sound board, microphone | Audio Telephony Collaboration Services |
| III | keyboard, video display | Text Collaboration Services |

In accordance with the illustrated example embodiment, Table 1 illustrates the relationship between the identified system attributes of client computer 102 and the collaboration services available to the client computer. As depicted in Table 1, a client computer that is endowed with a digital camera, speaker(s), sound board, video board, and a microphone can utilize Level I collaboration services such as, for example, video telephony collaboration services, or a still picture telephony collaboration services. If the client computer cannot utilize Level 1 collaboration services, and is endowed with speaker(s), a sound board and a microphone can nevertheless utilize Level II collaboration services such as, for example, audio telephony collaboration services. If, however, the client computer is not endowed with the system attributes necessary to utilize Level I or Level II collaboration services, the client can nevertheless utilize the default Level III collaboration services such as, for example, text collaboration services. As will be discussed in greater detail below, with respect to FIG. 3, while in a collaboration session, the bridgeport (e.g., page bridgeport 162) may dynamically change the collaboration service level utilized to accommodate quality of service considerations.

Continuing with the illustrated example embodiment of FIG. 2, if, in step 212 it is determined that an audio collaboration service or a video collaboration service is to be employed, page bridgeport 162 selects a changeover bridgeport or an Integrated Remote Access Server (IRAS) (to be discussed more fully below), and registers the call on the selected network element, step 214. In one embodiment, the selected network element is a bridgeport, such as bridgeport 165 (e.g., changeover bridgeport), where the requested collaboration session is routed off Internet 150 and onto PSTN 140. The selection of a changeover bridgeport is made from a "community" of bridgeports, to be described more fully below. In one embodiment, the community of bridgeports are "private" bridgeports deployed by the owner of web server 128 (e.g., a corporation). In another embodiment, the community of bridgeports are "public" bridgeports deployed by a service company that offers the bridgeport service of the present invention, and subscribed to by the corporation of web server 128. Note that page bridgeport 162 may select itself as the changeover bridgeport, either because of the selection criteria employed dictate the result, or by virtue of a singleton community, i.e. page bridgeport 162 is the only bridgeport in the "community" of bridgeports. For ease of understanding, the remaining descriptions will be presented in the context of bridgeport 165 being the selected changeover bridgeport.

Upon selecting changeover bridgeport 165, for the illustrated embodiment, page bridgeport 162 registers the requested call with changeover bridgeport 165, step 214. In one embodiment, the registration reserves bandwidth on changeover bridgeport 165 for the requested call. For example, in one embodiment, the registration includes provision of the source IP address of the collaboration session, i.e. the IP address of client computer 102, the source type (e.g. H.323), the destination address, i.e. the destination PSTN extension of collaboration partner 142, and the destination type (e.g. POTS).

Next, for the illustrated embodiment, page bridgeport 162 identifies changeover bridgeport 165 to client computer 102, providing client computer 102 with the IP address of changeover bridgeport 165, step 216. In one embodiment, where the request is made through an HTTP connection, step 216 also includes closing the HTTP connection. In one embodiment, the identification also includes provision of the URL of web server 128. In one embodiment, both the identification, i.e. the IP address of changeover bridgeport 165, and the URL of web server 128 are provided to the bridgeport driver resident on client computer 102.

Next, for the illustrated embodiment, client computer 102 places a net call to changeover bridgeport 165, step 218. In one embodiment, the net call is an H.323 call placed by an Internet telephony application. In one embodiment, step 218 also includes automatic launching of the Internet telephony application to place the net call, if an Internet telephony application has not been previously launched. For the illustrated embodiment, the automatic launching is performed by the bridgeport driver resident on client computer 102.

In response, changeover bridgeport 165 places a call to circuit switched network extension 143, and bridges the packet switched network and the circuit switched network, step 220, thereby enabling a user of client computer 102 to communicate with a user of collaboration partner 142. In the instance where the selected collaboration service enables audio or video communication, in bridging the two networks changeover bridgeport 165 digitizes and compresses inbound call signals received from collaboration partner 142, and delivers the encoded call signals to client computer 102 via the previously established H.323 connection. The compressed inbound call signals are decompressed by the communication interface of client computer 102 and rendered by the Internet telephony application. Similarly, outbound call signals emanating from client computer 102 are digitized by the audio interface, compressed by the communication interface of client computer 102 and delivered to changeover bridgeport 165 via the H.323 connection, wherein they are decompressed, and upon conversion, forwarded to collaboration partner 142. In other words, changeover bridgeport 165 converts the audio/video information between the circuit switched network and the packet switched network until call completion, step 218.

Returning to step 212 of the illustrated example method of FIG. 2, if it is determined that a text collaboration session is to be initiated, page bridgeport 162 determines whether the selected collaboration partner (e.g., collaboration client 142) is available through a packet switched network (e.g., Internet 150). If not, the process continues with step 214, wherein the page bridgeport 162 facilitates a circuit switched network connection to collaboration partner 142. If, alternatively, selected collaboration partner 142 is accessible via the packet switched network, page bridgeport 162 identifies an available network address corresponding to an appropriate collaboration partner, step 224. Those skilled in the art will recognize that any number of addressing schemes may be employed to uniquely identify particular clients on a network. For example, an Internet Protocol (IP) address, User Datagram Protocol (UDP) address, or a URL may be utilized. Having identified an available network address corresponding to selected collaboration partner 142 in step 224, page bridgeport 162 notifies client computer 102 of the network address, step 226. In particular, bridgeport 162 provides the identified network address to client computer 102 through the client bridgeport driver, or some other agent, which then "stuffs" the network address into the client software (e.g., browser, communication application, etc.). Having received the network address for collaboration partner 142 from page bridgeport 162, client software operating on client computer 102 uses the network address to establish a connection with collaboration partner 142 to facilitate the text collaboration session.

As alluded to above, in accordance with one embodiment of the present invention, the initiation of a collaboration session with a collaboration partner does not adversely effect the data communication session between client computer 102 and the webpage projected by web server 128. Indeed, if necessary, a "window", e.g., dedicated work space, for the text collaboration service or the video collaboration service is opened adjacent to the window employed for the data communication session. Further, in accordance with one embodiment of the present invention, once the collaboration session between client computer 102 and collaboration partner 142 is initiated, the data communication session between client computer 102 and web server 128 may be "synchronized" with the data communication session between collaboration partner 142 and web server 128. This feature allows the user of client computer 102 and collaboration partner 142 to view a common web page to facilitate their communication on the subject of the web page. A detailed description of synchronizing webpage browsing in such a manner is provided in the previously incorporated by reference application entitled "Method and Apparatus for Synchronizing Information Browsing Among Multiple Systems".

Figure 3:
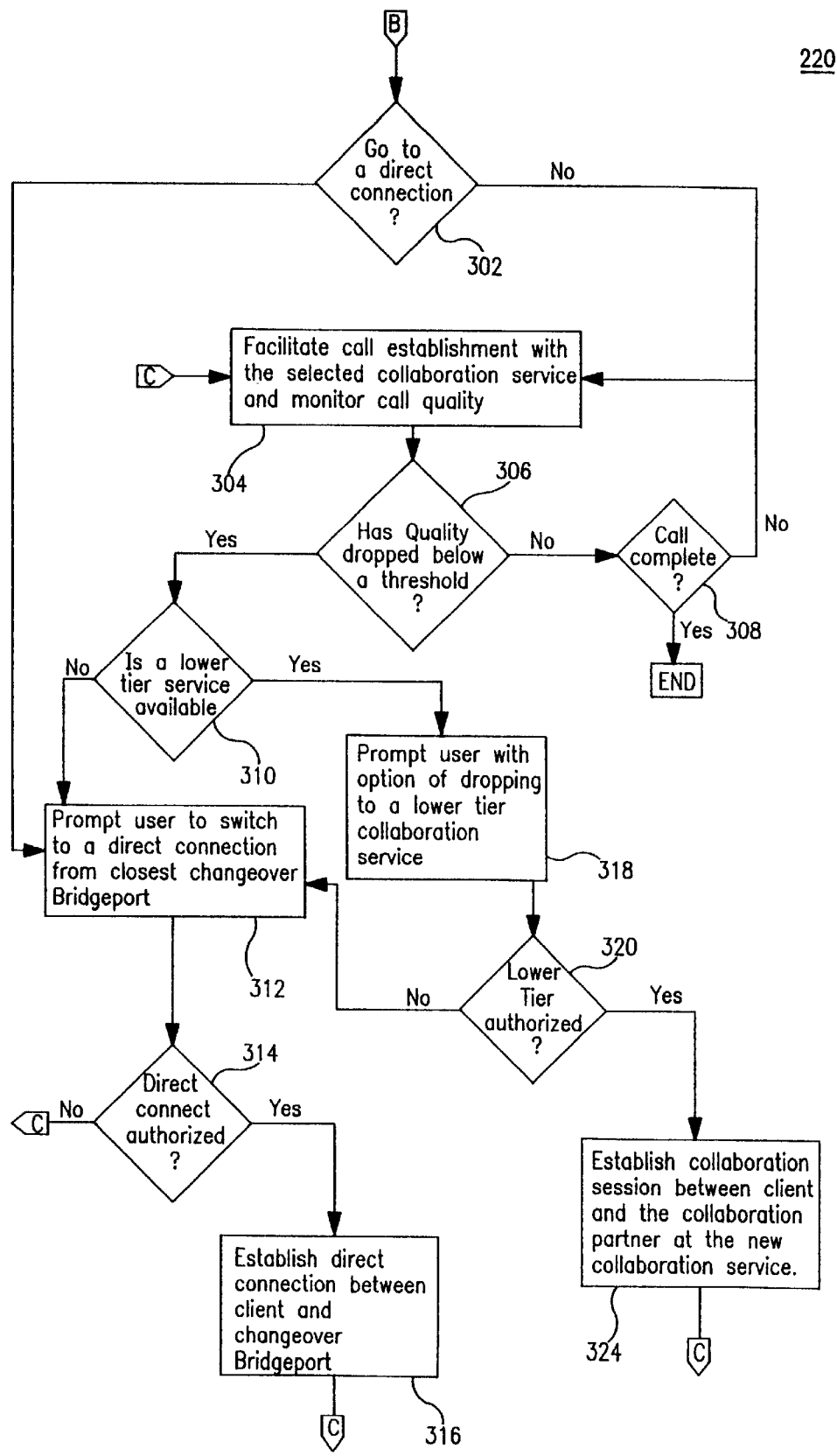
FIG. 3 is a flow chart illustrating one example embodiment of a method for facilitating a collaboration session between a client computer and a collaboration partner, in accordance with the teachings of the present invention.

With reference now being made to FIG. 3, one example embodiment of facilitating the collaboration session described in step 220 is illustrated. As illustrated in the example embodiment of FIG. 3, the user of client computer 102 is presented with the option of establishing a direct connection between client computer 102 and changeover bridgeport 165, step 302. If the user decides not to establish a direct connection, step 302, the collaboration session is established and the quality of service of the collaboration session is measured and monitored against a predetermined quality threshold, step 304. Any number of metrics known in the art may be beneficially employed to measure the quality of the collaboration session, e.g. the number of audio packets dropped within a predetermined time interval (Packet Error Rate), the signal to noise ratio, the rise in the measured noise floor, and the like. If it is determined that the quality of service has not dropped below a predetermined threshold, and the collaboration session is not yet complete, step 308, the process loops back to step 304, and the collaboration session continues.

If, however, in step 306, it is determined that the quality of service has dropped below a predetermined threshold, changeover bridgeport 165 determines whether a lower tier collaboration service is available. For example, if the collaboration session was initiated as a Level I collaboration service, a Level II or a Level III collaboration service may well support the continuation of the collaboration session at an improved quality level. In the illustrated example embodiment, prior to changing the collaboration session to a lower tier collaboration service, changeover bridgeport 165 prompts the user of client computer 102 with the option of dropping to the lower tier collaboration service, step 318. Changeover bridgeport 165 receives the response from the user of client computer 102 and determines whether the transition to the lower tier collaboration service is authorized, step 320.

As will be described in greater detail below in FIG. 4, if the transition to a lower tier collaboration service is authorized in step 320, the changeover bridgeport 165 establishes the collaboration session between the client computer 102 and collaboration partner 142 using the new collaboration service. In an alternate embodiment, rather than being prompted by changeover bridgeport 165 to change to a lower tier collaboration service, the user of client computer 102 may choose to initiate a change to a lower tier of collaboration service, for any number of reasons. In yet another embodiment, rather than prompting the user of client computer 102 with the option of transitioning to a lower tier collaboration service, changeover bridgeport 165 unilaterally transitions to the lower tier collaboration service without further user intervention.

If, however, in step 310 it is determined that a lower tier collaboration service is not available, or in step 320, the user of client computer 102 decides not to transition to a lower tier collaboration service, changeover bridgeport 165 prompts the user with the option to switch to a direct connection between the client computer 102 and the changeover bridgeport. In step 314, changeover bridgeport 165 determines whether the user of client computer 102 has authorized the direct connection (e.g., engaging in a direct connection with a minimum number of intermediaries between the client computer and the changeover bridgeport). If the direct connection is not authorized in step 314, the process loops back to step 304 and the collaboration session continues. If, however, the direct connection is authorized in step 314, a direct connection between client computer 102 and the changeover bridgeport is completed in step 316, as will be described more fully in FIG. 5. Thus, a bridgeport incorporating the teachings of the present invention enables a collaboration session between a client computer and a circuit switched network extension, commensurate with the system attributes of the client computer and the desired quality of the collaboration session.

Figure 4:
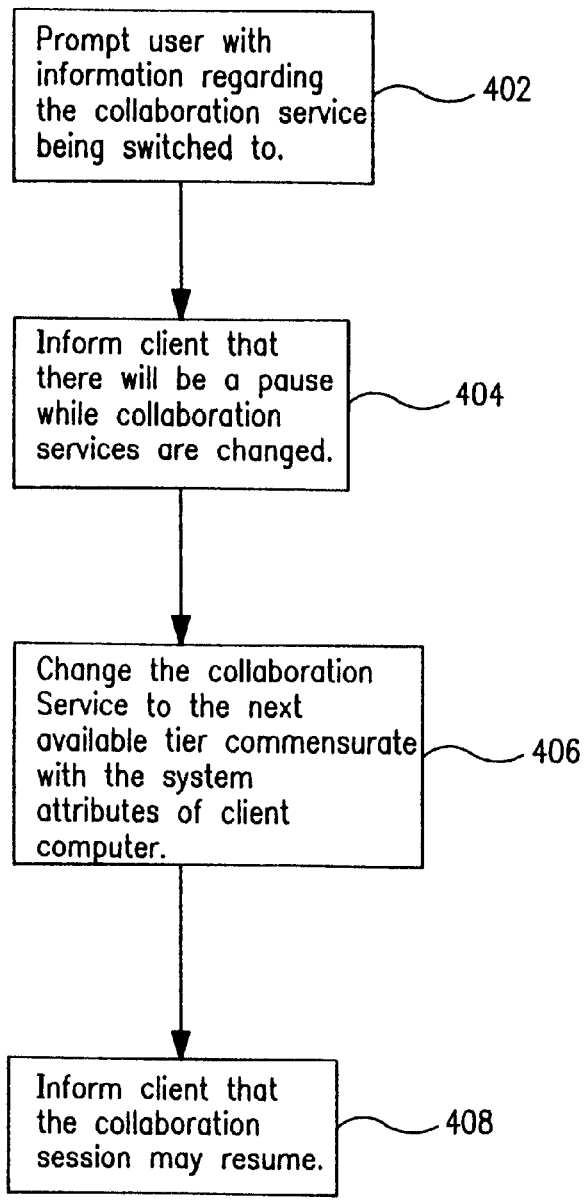
FIG. 4 is a flow chart illustrating an example method for transitioning between different collaboration services within the hierarchy of collaboration services, in accordance with the teachings of the present invention.

With reference now being made to FIG. 4, one example method for transitioning from one collaboration service to another is depicted. In one embodiment, in accordance with step 324 of the illustrated example embodiment of FIG. 3, FIG. 4 illustrates transitioning the collaboration session from a higher tier collaboration service to a lower tier collaboration service. Those skilled in the art will recognize, however, that the following steps may also be practiced in transitioning the collaboration session from a lower tier collaboration service to a higher tier collaboration service. Once the user of client computer 102 has decided to transition to a different collaboration service, the user is prompted with information regarding the collaboration service to which the user is being transitioned, step 402. In accordance with the example embodiment, the client is informed that there may be a brief interruption in the collaboration session while the transition is made, step 404. In one embodiment, the information of step 404 is provided via an audio message. In an alternate embodiment, the information of step 404 is provided via a message prompt on client computer 102. In step 406, the collaboration service is transitioned to the next available tier commensurate with the system attributes of client computer. Having transitioned to the next collaboration service tier, the user of client computer 102 is informed that the transition has been made, and that the collaboration session may resume.

Figure 5:
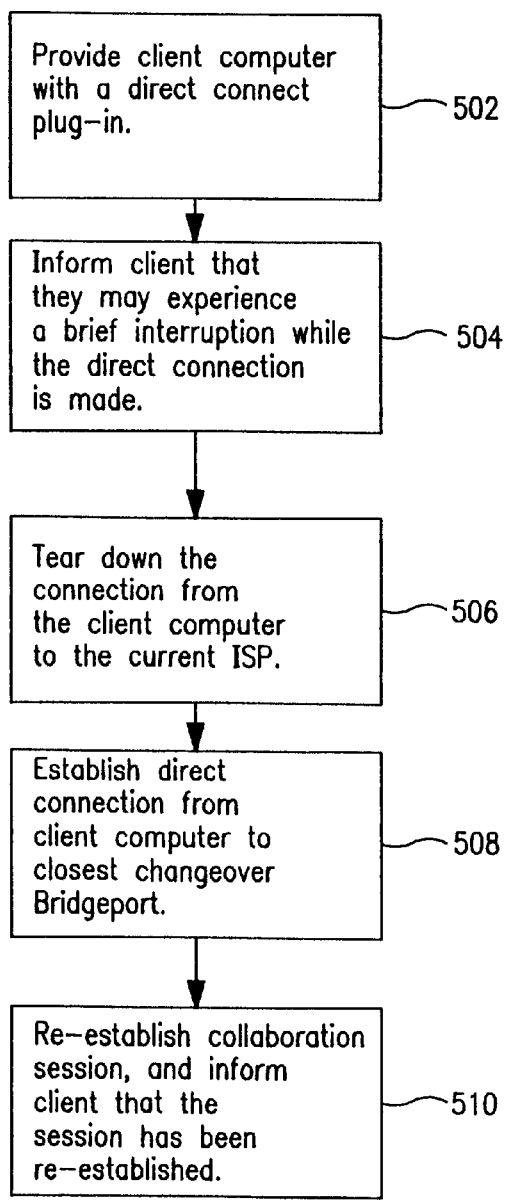
FIG. 5 is a flow chart illustrating an example method for establishing a direct connection, suitable for use in the present invention.

Turning now to FIG. 5, a flow chart illustrating one embodiment of a method for establishing a direct connection between client computer 102 and the circuit switched network extension 143. In the context of the illustrated embodiment, changeover bridgeport 165 provides software to client computer 102, step 502. The software is a set of instructions containing information necessary to enable client computer 102 to establish a connection with changeover bridgeport 165. Upon receipt of the software by client computer 102, the software tears down the existing data connection between client computer 102 and the ISP currently in direct telephony contact with client computer 102 (e.g., ISP 112), step 504. Having disconnected the prior connection, the provided software initiates a direct connection to changeover bridgeport 165 through the modem of client computer 102, thereby eliminating any intermediate servers, step 506. For the illustrated embodiment, the software is "equipped" with one of changeover bridgeport's PSTN extensions before being provided to client computer 102. Finally, once the direct connection from client computer 102 is established, changeover bridgeport 165 logically "re-links" client computer 102 with the circuit switched network 143, step 508, thereby allowing the previously established collaboration session with collaboration partner 142 to be re-connected, step 510 (although, it should be noted that the physical PSTN connection between the changeover bridgeport and the destination PSTN extension is maintained throughout the direct connect process; rather, it is the data connection between the client computer and the changeover bridgeport that is disconnected and reestablished). In an alternate embodiment, direct connect software may be pre-installed on client computer 102, e.g. as an integral part of client bridgeport application described earlier.

In one embodiment, changeover bridgeport 165 proceeds to step 312 directly, without first monitoring the quality of the collaboration session, if the changeover bridgeport 165 "knows" a priori that the quality of the collaboration session will be below an acceptable threshold. For example, assume that it has been determined that the quality of a collaboration session drops below a predetermined quality level when the number of intermediate servers between a client computer (e.g., client computer 102) and a changeover bridgeport (e.g., changeover bridgeport 165) exceeds a certain number $N_2$. Given this example, notwithstanding the fact that changeover bridgeport 165 was selected as the "best" changeover bridgeport from the "community" of bridgeports, if the actual number of intermediate servers $N_1$ between client computer 102 and changeover bridgeport 165 exceeds $N_2$, changeover bridgeport 165 will know, before the collaboration session has been established, that the quality of the collaboration session will be below the acceptable predetermined quality level. In one embodiment, the number of intermediate servers is returned to changeover bridgeport 165 when page bridgeport 162 selects bridgeport 165 as the changeover bridgeport, and registers the collaboration session with changeover bridgeport 165. In one embodiment, changeover bridgeport 165 preserves the inputs along with the registration information for use at step 312. In another embodiment, bridgeport 165 may retain up to a predetermined number of "bid responses", which will include the number of intermediate servers, for a period of time sufficiently long to ensure that if bridgeport 165 is selected as the changeover bridgeport, the bid response information is available.

In an alternate embodiment, changeover bridgeport 165 proceeds to step 312 directly, without having first monitored the quality of the collaboration session, if changeover bridgeport 165 was instructed to do so by page bridgeport 162 when page bridgeport 162 selects bridgeport 165 as the changeover bridgeport and registers the collaboration session. Page bridgeport 162 may select to so instruct changeover bridgeport 165 based on a similar decision process described earlier for the case where changeover bridgeport 165 makes the decision. Alternatively, page bridgeport 162 may do so because it is so instructed by web server 128, through parameters embedded within the Push-To-Collaborate™ button. In other words, the Push-To-Collaborate™ button, projected by web server 128, is a "direct quality" Push-To-Collaborate™ button that inherently includes offering the user of client computer 102 to conduct the collaboration session via a direct connection at a "direct quality" level.

In summary, from the example embodiment provided above, page bridgeport 162, in response to a Push-To-Collaborate™ event notification, identifies the system attributes of client computer 102 and selects an appropriate collaboration service from a hierarchy of collaboration services commensurate with the identified system attributes to establish and facilitate a collaboration session between client computer 102 and collaboration partner 142. In those instance where an audio or video telephony collaboration service is selected, or when it is desirable for a text collaboration session to be conducted via a circuit switched network, page bridgeport 162 is also tasked with identifying a changeover bridgeport 165 from a "community" of bridgeports to establish and facilitate a collaboration session between client computer 102 and a circuit switched network extension (e.g., extension 143 for collaboration partner 142). As described, the changeover bridgeport 165, in response to the placement of a "net call" from client computer 102 establishes a connection from the packet switched network to the circuit switched network and, in particular, to the appropriate circuit switched network extension, bridging the two networks to facilitate the collaboration session. In so doing, client computer 102 may be offered to have the collaboration session conducted at a "direct quality" level via a direct connection between client computer 102 and changeover bridgeport 165. The offer may be presented dynamically in the middle of the collaboration session, at the discretion of changeover bridgeport 165, as it detects the quality of the collaboration session dropping below an predetermined quality level. Alternatively, the offer may be presented at the beginning of the collaboration session, at the discretion of changeover bridgeport 165, page bridgeport 162 or web server 128.

Note that except for the solicitation of the concurrence of the user of client computer 102 to switch to a direct connection with changeover bridgeport 165, steps 204–228 are all performed automatically in response to step 202, without requiring any intervention from the user of client computer 102. In particular, it does not require the user of client computer 102 to enter the telephone number for the circuit switched network extension of collaboration partner 142, nor the IP address of changeover bridgeport 165. It does not even require the user of client computer 102 to know this information. All that is required of the user is metaphorically "pushing" the Push-To-Collaborate™ button projected by web server 128. Furthermore, it should also be noted that the concurrence of the user of client computer 102 is not necessary. For example, in the instance where the direct connection will be toll free, e.g., a local call, or the changeover bridgeport has an "800" access number, or the toll charge is to be borne by the web server, the Push-To-Collaborate™ button may be embedded with direct connection software that automatically establishes a direct connection with the changeover bridgeport.

It should also be noted that the collaboration session has minimal impact on establishing any additional data connections with any number of web servers 120 and 128. In other words, client computer 102 may continue to browse webpages offered by web servers 120 and 128, while simultaneously supporting the collaboration session with collaboration partner 142 via changeover bridgeport 165 and circuit switched network extension 143. In addition, although there may be a number of intermediate routers in Internet 150 between changeover bridgeport 165 and client computer 102, in the instance where changeover bridgeport is supporting an audio collaboration session or a video collaboration session changeover bridgeport 165 is the only server charged with supporting both the collaboration session and the H.323 (multimedia) connection, thus the collaboration session is transparent to the intermediate routers. In other words, the information exchange between changeover bridgeport 165, through the plurality of intermediate routers of Internet 150, to client computer 102 will appear as normal data packets to the intermediate routers.

Returning now to the selection of a changeover server described in step 214, page bridgeport 162 selects changeover bridgeport 165 from a community of bridgeports. In one embodiment, page bridgeport 162 first solicits input on a number of call characteristics from each bridgeport member of the community. The call characteristics may include the number of intermediate servers (Is) required to connect client computer 102 with the responding bridgeport member, the toll charge (Tc) that may be incurred by placing the call from the responding bridgeport, the bandwidth (B) currently available on the responding bridgeport, the number of PSTN connections (P) supported by the responding bridgeport, service premiums (S), if any, charged by the responding bridgeport, and so forth. In the context of the example implementation, one member bridgeport may respond with an indication that there are no intermediaries between itself and client computer 102 which may provide a higher quality of service, however, given its connection point to the circuit switched network (e.g., PSTN 140), there may be a significant toll charge incurred in placing the call to circuit switched network extension 143 from this member bridgeport. On the other hand, another member bridgeport may respond with a low toll charge, but with a higher number of intermediaries as the collaboration session will have to route through a large number of routers.

In any event, for the illustrated embodiment, page bridgeport 162 calculates a Call Metric (CM) for each of the responding bridgeport that is representative of the bridgeports ability to establish and facilitate the collaboration session between client computer 102 and collaboration partner 142 located at extension 143. Equation (1) is an exemplary equation used to calculate the Call Metric for each of the responding bridgeport, wherein the bridgeport with the lowest CM is determined to be able to provide the best all around service. It should be noted that equation (1) is merely illustrative, as one skilled in the art will appreciate that suitable alternative equations may be beneficially employed to calculate alternative call metrics.

$$CM_i = W_1(Is_i) + W_2(Tc_i) + \frac{W_3}{B_i} + \frac{W_4}{P_i} + W_5(S_i) \text{ where:} \tag{1}$$

-continued

Is   number of intermediate servers
Tc   toll charge estimate
B   available bandwidth on responding server
P   number of PSTN ports available on responding server
S   premium service charge
W   weighting factor In one embodiment of the present invention, the number of intermediate servers (Is) is determined by each of the responding bridgeports from the community of bridgeports through the use of a "traceroute" function, common to the UNIX network operating environment. As one skilled in the art will appreciate, the execution of a "traceroute" command by a bridgeport will produce a result quantifying the number of intermediate routers between the execution bridgeport and a destination address (provided in the command line). Accordingly, in one embodiment, the execution of the command: "traceroute (IP_address)", will return a number representative of the intermediate routers required for the responding bridgeport to communicate with the source address, represented by IP_address.

In one embodiment, an estimate of the toll charge is determined locally at the responding bridgeport by accessing a toll rate table stored on the responding bridgeport. An example toll rate table is depicted in Table 2. As illustrated in the example toll rate table of Table 2, an estimate toll charge is determined by analyzing the components of the destination telephone number against a toll charge hierarchy. If none of the elements of the destination telephone number match (i.e., hit) the elements of the toll rate table, a high toll charge estimate is returned. If, however, there is a hit on the area code and the telephone number prefix, a much lower toll charge or even toll free estimate is returned. In alternate embodiments of the present invention, the responding bridgeport may query the local SSP (i.e., the SSP to which it is coupled) to ascertain a specific toll charge value. In such a case, the communication between the responding bridgeport and the local SSP is conducted via an out-of-band signaling protocol such as Signaling System 7 (SS7).

TABLE 2

TOLL CHARGE LOOKUP TABLE

| Elements of Destination Telephone No. | Relative Toll Charge Estimate |
|---|---|
| No Hit | $ $ $ $ |
| Area Code Hit | $ $ |
| Area Code and PSTN Prefix Hit | 0 |

In an alternate embodiment, page bridgeport 162 may also involve client computer 102 in the selection of a changeover bridgeport, by presenting the solicited responses to the client computer 102, in either an uncondensed or a condensed format. Whether client computer 102 should be involved in the selection process is a design choice, a trade off between ease of use (without requiring intervention from the user of client computer 102) and functionality (allowing the user of client computer 102 to veto or influence the selection). Between the two distinct choices, a number of hybrid arrangements can also be made.

It should also be noted that while bridgeport 162 is being described as page bridgeport and bridgeport 165 is being described as changeover bridgeport, being members of a community of bridgeports, a member bridgeport not only may be a page bridgeport at one point in time, and a changeover bridgeport at another time, a member bridgeport actually can be a page bridgeport and a changeover bridgeport at the same time for either the same or different clients. As will be readily apparent from the descriptions to follow, bridgeports 162 and 165 of the present invention can be practiced with computer servers programmed to perform the above described bridgeport functions, thus it is expected that a bridgeport may be integrated with other equipment in a variety of manners, for examples, with a web server, an ISP, a STP, and so forth.

Figure 6:
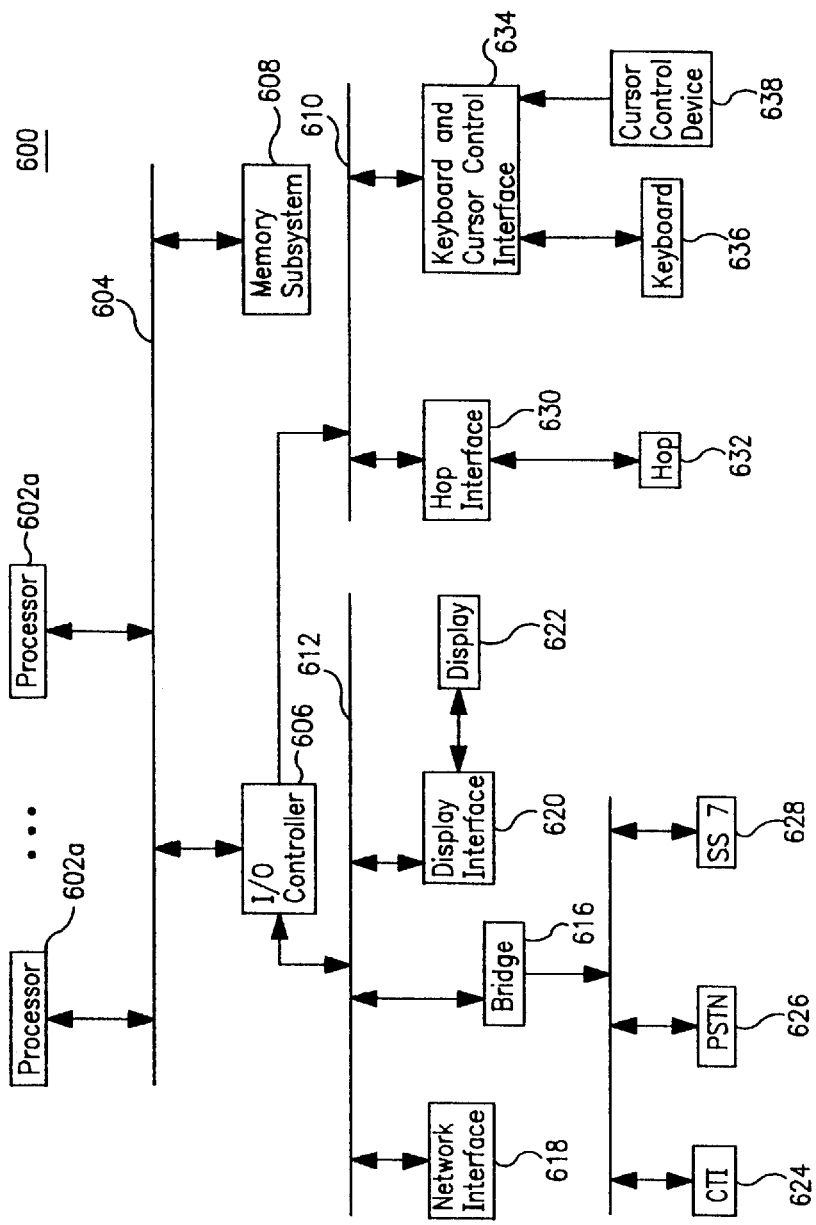
FIG. 6 is a block diagram illustrating one example of a server incorporating the teachings of the present invention.
Figure 7:
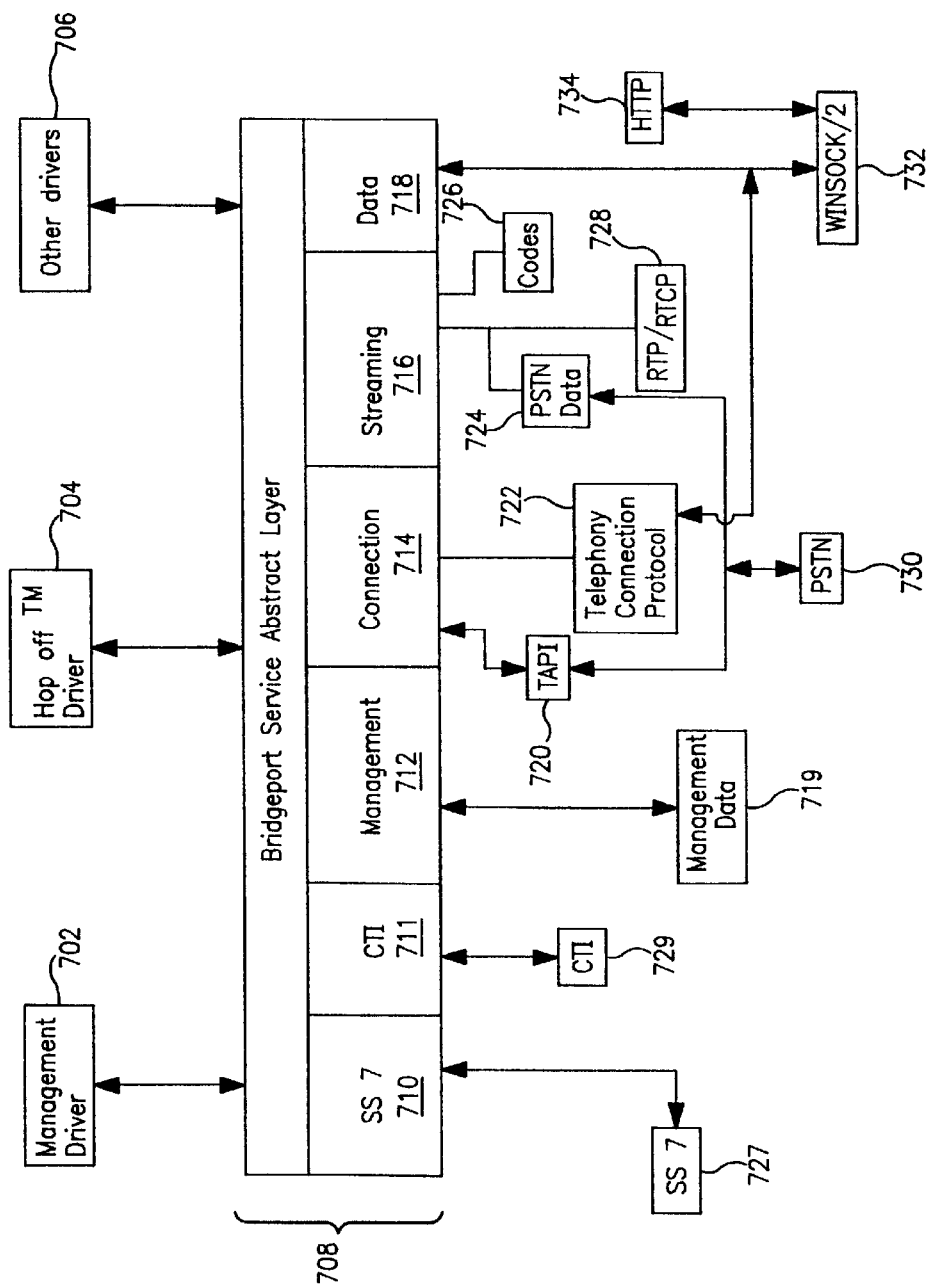
FIG. 7 is a block diagram illustrating an example software architecture for the example server of FIG. 6, incorporating the teachings of the present invention.

Turning now to FIGS. 6 and 7, two block diagrams illustrating the hardware and software elements of one example computer server 600 suitable to be employed as a bridgeport are depicted. As illustrated, example computer server 600 is comprised of multiple processors 602a–602n and memory subsystem 608 coupled to processor bus 604 as depicted. Additionally, computer server 600 is comprised of a second bus 610, a third bus 612 and a fourth bus 614. In one embodiment, buses 612 and 614 are Peripheral Component Interconnect (PCI) buses, while bus 610 is an Industry Standard Architecture (ISA) bus. PCI buses 612 and 614 are bridged by bus bridge 616, and bridged to ISA bus 610 and processor bus 604 by I/O controller 606. Coupled to PCI bus 612 are network interface 618 and display interface 620, which in turn is coupled to display 622. Coupled to PCI bus 614 is computer telephony interface (CTI) 624, PSTN interface 626 and SS7 Interface 628. Coupled to ISA bus 610 are hard disk interface 630, which in turn is coupled to a hard drive 632. Additionally, coupled to ISA bus 610. keyboard and cursor control device 634, which in turn is coupled keyboard 636 and cursor control device 638.

CTI interface 624 provides the necessary hardware to interface exemplary computer server 600 to circuit switched network equipment, such as private branch exchange (PBX) equipment. PSTN interface 626 provides the necessary hardware to interface exemplary computer server 600 to a plurality of circuit switched network communication lines (e.g., T1, E1 or POTS), wherein the actual number of communication lines interfaced will be implementation dependent. Additionally, PSTN interface 626 provides advanced DSP-based voice, dual-tone multiple frequency (DTMF) and call progress functionality, which allows for downloadable DSP protocol and voice processing algorithms, thereby providing CODEC support locally on the interface. Examples of supported codecs include the Global System for Mobile Communications (GSM) codec and the ITU-T G.723.1 protocol codecs, the specification for which are commonly available from the GSM consortium and the International Telecommunications Union, respectively. Similarly, SS7 interface 628 provides the hardware necessary to interface exemplary computer server 600 with trunk lines (e.g., ISDN) supporting the out-of-band communication protocol (e.g., SS7)) used between PSTN network elements (i.e., SSP-SSP, SSP-STP, STP-SCP, etc.). In one embodiment, PSTN interface 626 is preferably an AG-T1™ (for U.S. implementations, while an AG-E1 may be seamlessly substituted for European implementations), while SS7 interface 628 is preferably the TX3000™, both of which, along with their accompanying software drivers, are manufactured by and commonly available from Natural MicroSystems of Natick, Mass. Otherwise, all other elements, processors 602*, memory system 608 and so forth perform their conventional functions known in the art. Insofar as their constitutions are generally well known to those skilled in the art, they need not be further described.

From a software perspective, FIG. 7 illustrates the software elements of the illustrated example computer server 600 depicted in FIG. 6. In particular, computer server 600 is shown comprising an application layer consisting of a Bridgeport Management Driver 702, Hop Off™[4] driver 704, and other drivers 706. Hop Off™ driver 704, supported by Management Driver 702, optional drivers 706, and abstracted service layer 708 implements the method steps of FIG. 2 that are the responsibility of the community of bridgeports (i.e., bridgeports 162, and 165). Accordingly, changeover bridgeport 165 may be referred to as a Hop Off™ bridgeport, in view of its incorporation of Hop Off™ driver 704.

[4] Hop Off™ is a Trademark of eFusion™, Incorporated of Beaverton, Oreg.

The Service Abstract Layer (SAL) 708 is shown comprising SS7 services 710, CTI Services 711, Management Services 712, Connection Services 714, Streaming Services 716, and Data Services 718. The protocol/service layer is shown comprising Telephony Application Programming Interface (TAPI) 720, Telephony Connection Protocol 722, PSTN Data Interface 724, CODEC 726, Real Time (Streaming) Protocol 728, and HTTP server 734. Also shown in this "layer" are configuration management data 419 maintained by management service 712, and codec services 726 employed by streaming services 716. The driver layer is shown comprising SS7 driver 727, CTI driver 729, PSTN driver 730 and socket service 732. Data and control information are exchanged between these elements in the fashion depicted.

Within the context of the present invention, one purpose of SAL 708 is to provide an Application Programming Interface (API) for all the available bridgeport and related services in exemplary computer server 600. The API abstracts out the actual modules used for providing services such as connection establishment (714), streaming and data exchange services (716 and 718). Additionally, SAL 708 provides the common operation tools such as queue management, statistics management, state management and the necessary interface between the software services (e.g., drivers in the driver layer). SAL 708 is also responsible for loading and unloading the appropriate drivers as appropriate.

Connection service 714 includes a connection establishment and tear-down mechanism facilitating the interconnection to the PSTN 140. Additionally, for the illustrated embodiment, connection service 714 employs connection and compatibility services which facilitate interoperation between communication equipment that support industry standards, thereby allowing a variety of communication equipment manufactured by different vendors to be benefited from the present invention. Connection services 714 include, in particular, services for supporting standard video telephony, ITU-T's H.323 video telephony, and standard data communication, such as ITU-T's T.120 data communication protocol. Examples of the connection establishment and tear-down mechanisms supported by connection service layer 714 include opening and starting PSTN ports, call control, DTMF collection, and tone generation, to name but a few.

Streaming service 716 is responsible for interfacing with the components that provide the real-time streaming functionality for the multimedia data. Once the connection has been established between the connection points (i.e., PSTN, H.323, etc.), streaming service 716 will take over the management and streaming of data between the two connected parties, until the connection is terminated. CODEC service 726 facilitates the above described compression and transmission of inbound call signals from collaboration partner 142 as well as decompression and transmission of outbound call signals from client computer 102.

Data service 718 is responsible for providing non real-time peer to peer (i.e., computer-computer) messaging and data exchange between exemplary computer server 600 and other Internet and perhaps PSTN based applications. Sending messages to exemplary computer server end-points (i.e., other similarly equipped bridgeports on the Internet) or other servers within the PSTN is accomplished via data service 718.

CTI services 711 service all communications and automatic call distribution (ACD) necessary for Private Branch Exchange (PBX) based systems. SS7 services 710 service all out of band communications with STPs and/or SCPs of PSTN 140.

PSTN driver 730 is equipped to accommodate particularized PSTN interfaces 726, whereas CTI driver 729 is equipped to support particularized ACD and PBX equipment. Similarly, SS7 driver 727 is equipped to support particularized SS7 interface 628.

Figure 8:
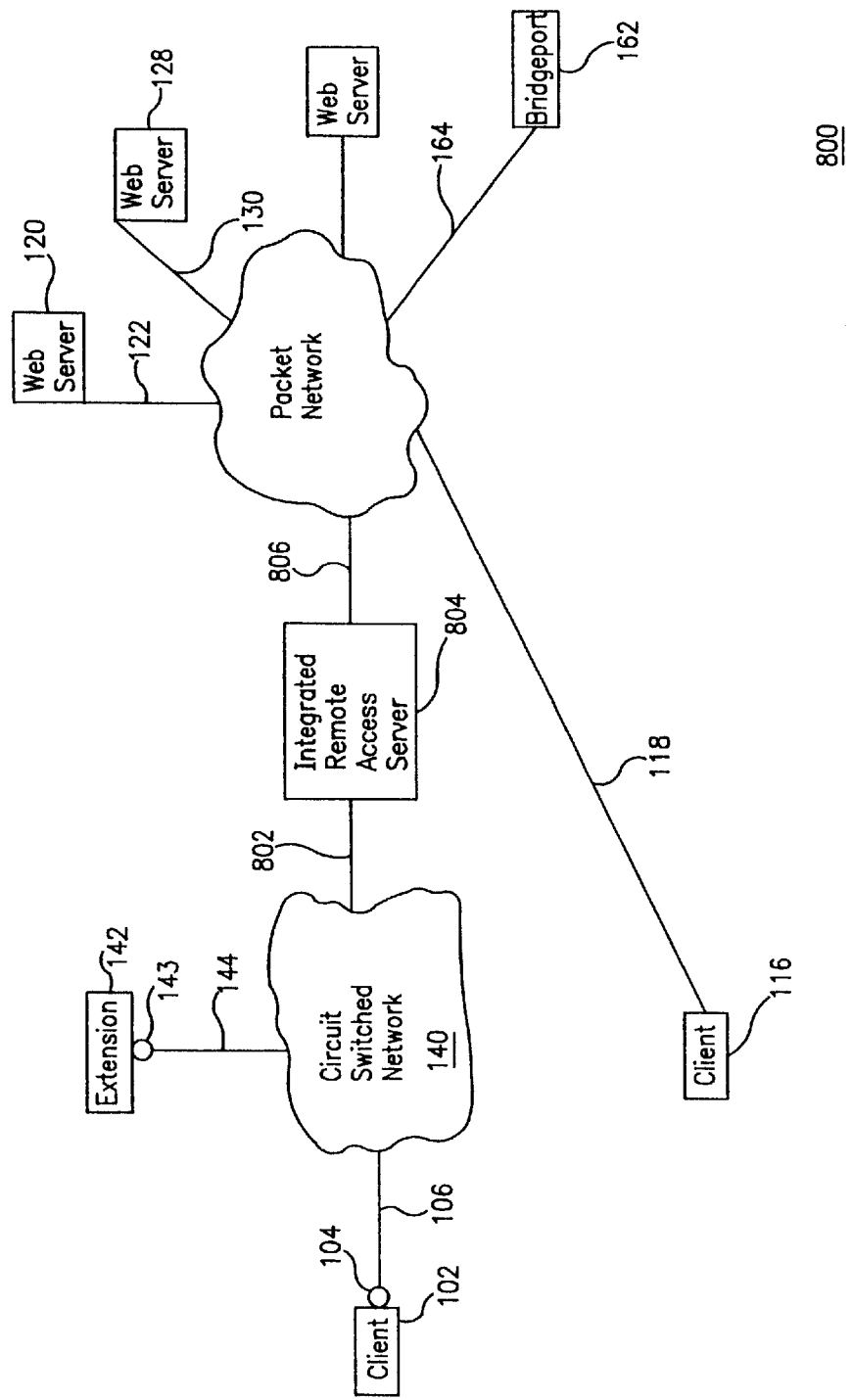
FIG. 8 is a block diagram illustrating an alternate embodiment of a communication system incorporating the teachings of the present invention.

Turning next to FIG. 8, one example of an alternate communication system 800 incorporating the teachings of the present invention is depicted. When compared with example communication system 100, communication system 800 includes an additional network element, e.g., Integrated Remote Access Server (IRAS) 804. As will be described in greater detail below with reference to FIG. 9, IRAS 804 may be described as a common network router endowed with CTI capability. In operation, page bridgeport 162 functions as described above in communication system 100. However, rather than selecting a changeover bridgeport (e.g., bridgeport 165), page bridgeport 162 provides the necessary bridgeport control functions in accordance with the teachings of the present invention, while utilizing IRAS 804 as the CTI interface. Communication system 800 may prove beneficial from a cost standpoint, insofar as bridgeport 162 need not include CTI interface 624, PSTN interface 626 or SS7 interface 628 (and their accompanying software drivers) of FIGS. 6 and 7, communicating with IRAS via network interface 618. Thus, in operation, the method steps of FIGS. 2 through 5 remain the same with the exception that when referring to a changeover bridgeport (165), wherein the functionality of the changeover bridgeport is handled by page bridgeport 162 and IRAS 804 in communication system 800.

Figure 9:
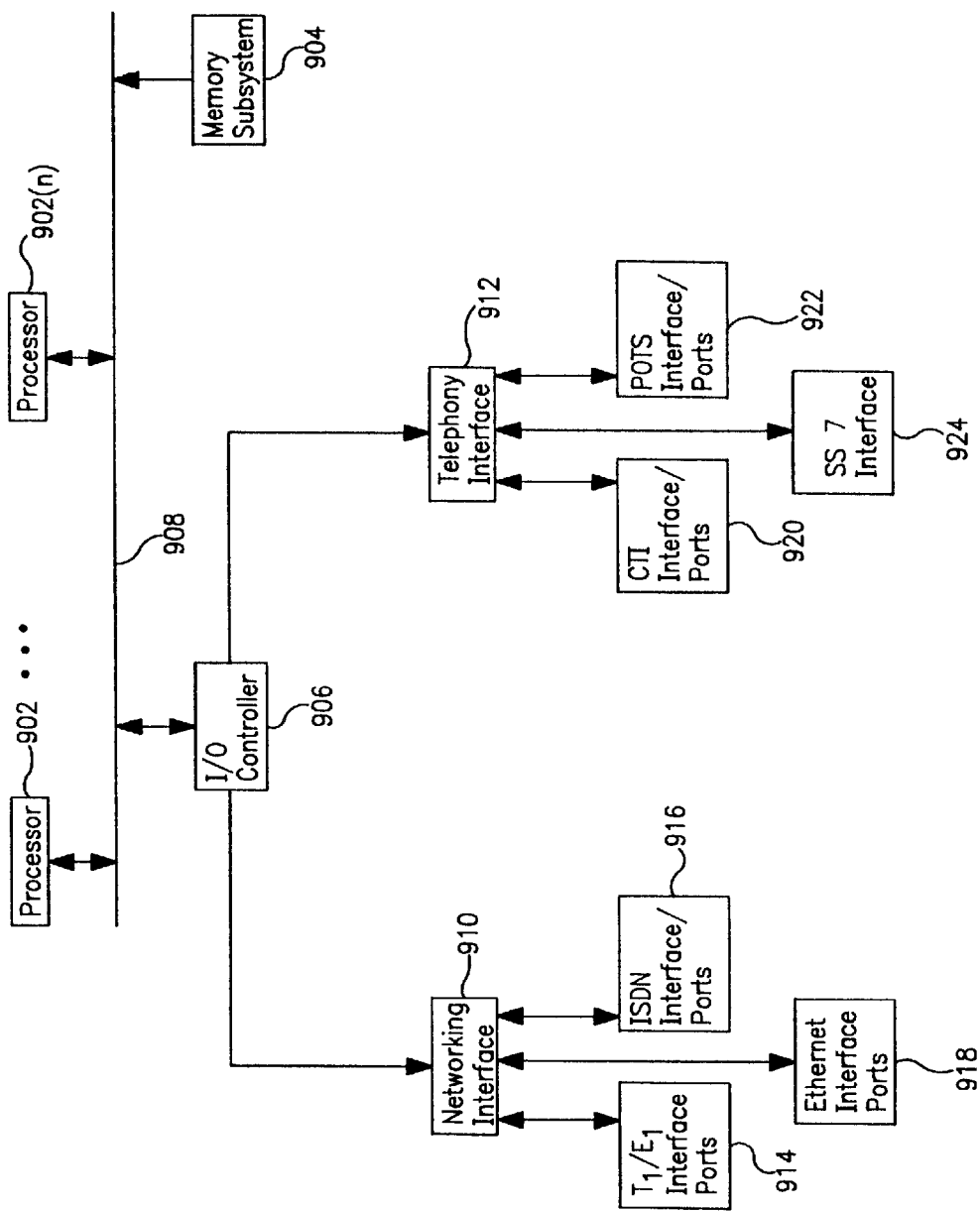
FIG. 9 is a block diagram of an Integrated Remote Access Server, suitable for use in the example communication system of FIG. 8.

Turning to FIG. 9, a block diagram of one example of an Integrated Remote Access Server (IRAS) 900 is presented. In one embodiment of the present invention, IRAS 900 may be beneficially introduced into communication system 800 as IRAS 804, facilitating the hierarchy of collaboration services offered in conjunction with bridgeport 162 incorporated with the teachings of the present invention. As illustrated in FIG. 9, IRAS 900 is equipped with at least one processor 902, but may include a plurality of processors 902(n), coupled to memory subsystem 904 and input/output (I/O) controller 906 via bus 908. As depicted, I/O controller 906, under the direction of at least one of the processor(s) 902–902(n) manages network interface 910 and telephony interface 912. Networking interface 910 manages a number of interfaces coupling IRAS 900 to a packet switched network (e.g., Internet 150. In one embodiment, networking interface 910 manages a plurality of T1/E1 interfaces 914, ISDN interfaces 916, Ethernet interfaces 918, and the like. Those skilled in the art will appreciate that each of the interfaces above has a corresponding set of software drivers (not shown). Similarly, telephony interface 912 manages a plurality of CTI interfaces 920, POTS interfaces 922, SS7 interfaces 924, and the like. Insofar as the description for each of the foregoing interfaces and their respective drivers were described above in FIGS. 6 and 7, they need not be described further here.

In summary, communication system 800 illustrates that the physical bridging functionality may be remotely located in IRAS 804, while the teachings of the present invention are retained in bridgeport 162, wherein the combination of elements enables client computer 102 to communicate with collaboration partner 142 at circuit switched network extension 143 via any of a hierarchy of collaboration services commensurate with the identified system attributes of client computer 102. Thus, the teachings of the present invention illustrated in the alternative embodiments of FIG. 1 and FIG. 8 offer alternative solutions to the limitations of the prior art, enabling a collaboration session between a client computer and a collaboration partner that is commensurate with the determined system attributes of the client computer through the use of the innovative hierarchy of collaboration services presented above.

While the method and apparatus of the present invention has been described in terms of the above illustrated embodiments, those skilled in the art will recognize that the invention is not limited to the embodiments so described. In particular, the present invention may beneficially be implemented in combination with other technology to accommodate a wide variety of communication needs. For example, in one alternate embodiment, wherein Level I, Level II, or Level III collaboration services are available to client computer 102, page bridgeport 162 prompts client computer 102 with the option of selecting the collaboration service to be employed, and the network medium with which to facilitate the collaboration session, wherein the exemplary process continues with either step 214 (circuit switched network) or step 224 (packet switched network). Thus, those skilled in the art will appreciate the present invention can be practiced with modification and alteration within the spirit and scope of the appended claims. Accordingly, the description is to be regarded as illustrative instead of restrictive on the present invention.

Thus, a method and apparatus for facilitating tiered collaboration has been described.

We claim:

1. A bridge server comprising:
   a storage medium having stored therein a plurality of programming instructions implementing a hierarchy of audio, video and textual collaboration services on the bridge server to be selectively employed to facilitate collaborations between users of client computers and users of agent computers in a collaboration manner selected in accordance with capabilities of the client computers and the agent computers,
   said instructions further implementing a service for automatically determining in real-time the audio, video and textual capabilities of each of said client computers, and therefore, the appropriate collaboration manner and the appropriate collaborative service to be employed; and
   an execution unit, coupled to the storage medium, to execute the plurality of programming instructions.

2. The bridge server of claim 1, wherein the automatic determining service comprising a service for dynamically ascertaining a plurality of audio, video and textual capability attributes of each of the client computers.

3. The bridge server of claim 2, wherein the service for dynamically ascertaining the audio, video and textual capability attributes of each of the client computers comprises a service for launching an agent program on each of the client computers to automatically determine, without user intervention, the audio, video and textual capability attributes of the particular client computer.

4. The bridge server of claim 2, wherein the service for dynamically ascertaining the audio, video and textual capability attributes of each of the client computers comprises a service for querying each of the client computers to provide the audio, video and textual capability attributes, without user intervention.

5. The bridge server of claim 1, wherein the audio, video and textual collaboration manners include at least two selected ones of (a) a manner that includes video telephony, (b) a manner that includes still picture telephony, (c) a manner that includes audio only telephony, and (d) a manner that includes text only collaboration.

6. The bridge server of claim 1, wherein the hierarchy of audio, video and textual collaboration services includes at least two selected ones of
   (a) a video telephony collaboration service to facilitate real time collaboration between a user of a client computer and a user of an agent computer that includes video telephony between the two users;
   (b) a still picture telephony collaboration service to facilitate real time collaboration between a user of a client computer and a user of an agent computer that includes still picture telephony between the two users;
   (c) an audio telephony collaboration service to facilitate real time collaboration between a user of a client computer and a user of an agent computer that includes audio only telephony between the two users; and
   (d) a text collaboration service to facilitate real time collaboration between a user of a client computer and a user of an agent computer that includes text only collaboration between the two users.

7. The bridge server of claim 1, wherein the audio, video and textual collaboration services further include a service to monitor a quality metric for an established audio, video or textual collaboration between a user of a client computer and a user of an agent computer, and to transition the established audio, video or textual collaboration from one audio, video or textual collaboration manner to another when it is determined that the quality metric has reached a predetermined threshold.

8. The bridge server of claim 1, wherein the audio, video and textual collaboration services further include a service to control a selected one of a locally disposed and a remotely disposed computer telephony interface to communicatively couple the bridge server to public switch telephone network (PSTN) extensions associated with the users of the agent computers.

9. The bridge server of claim 8, wherein the computer telephony interface is remotely located in an Integrated Remote Access Server (IRAS), communicatively coupled to the bridge server via a data network.

10. In a bridge server, a method of operation comprising:
    (a) receiving by the bridge server from a user of a client computer, an indication requesting a collaboration session between the user of the client computer and a user of an agent computer;
    (b) determining in real time by the bridge server, an appropriate collaboration manner from an hierarchy of audio, video and textual collaboration manners for the requested collaboration session, in accordance with capabilities of the client computer and the agent computer;
    (c) selecting by the bridge server a collaboration service from an hierarchy of audio, video and textual collaboration services provided by the bridge server for facilitating collaboration between users of client computers and users of agent computers to facilitate the requested collaboration in the determined appropriate collaboration manner; and (d) executing the selected collaboration service by the bridge server to facilitate the requested collaboration session between the user of the client computer and the user of the agent computer.

11. The method of claim 10, wherein the indication of (a) is received by the bridge server from the client computer when the user of the client computer, viewing a web page provided to the client computer by the agent computer, selects a collaboration request button of the web page.

12. The method of claim 10, wherein the determination of an appropriate audio, video or textual collaboration manner of (b) includes:

(b.1) downloading an agent program from the bridge server to the client computer;

(b.2) executing the downloaded agent program on the client computer to automatically determine, without user intervention, a plurality of audio, visual and textual capability attributes of the client computer; and (b.3) transmitting the automatically determined audio, video and textual capability attributes from the client computer to the bridge server.

13. The method of claim 10, wherein the determination of an appropriate audio, video or textual collaboration of (b) includes the bridge server querying the client computer to provide a plurality of audio, video and textual capability attributes of the client computer without user intervention.

14. The method of claim 10, wherein the determination of an appropriate audio, video or textual collaboration manner of (b) comprises determining whether the requested collaboration session should include video telephony, still picture telephony only, audio telephony only, or text collaboration only.

15. The method of claim 13, wherein the determination of an appropriate collaboration manner of (b) comprises:

(b.1) selecting a collaboration manner that includes video telephony if video telephony is supported by the client computer;

(b.2) selecting a collaboration manner that includes audio telephony if video telephony is not supported, but audio telephony is supported by the client computer; and (b.3) selecting a collaboration manner that includes text collaboration if telephony is not supported by the client computer.

16. The method of claim 10, wherein execution of the selected collaboration service of (d) comprises controlling a computer telephony interface to establish a telephony connection between the bridge server and the agent computer via a circuit switched network.

17. The method of claim 16, wherein said controlling of the computer telephony interface comprises issuing commands to a remotely located Integrated Remote Access Server (IRAS) housing the computer telephony interface.

18. An article of manufacture comprising:

a storage medium having stored thereon a plurality of computer executable instructions for use to program a bridge server, the instructions implementing a hierarchy of audio, video and textual collaboration services on the bridge server, enabling the bridge server to selectively facilitate collaboration between users of client computers and users of agent computers in a selected collaboration manner in accordance with capabilities of the client computers and the agent computers, the services including a service for determining audio, video and textual capabilities of each of the client computers and the agent computers, and accordingly, an appropriate collaboration manner.

19. The storage medium of claim 18, wherein the service for determining the appropriate manner of collaboration includes a service for determining a plurality of audio, video and textual capability attributes of the client computer.

20. The article of claim 18, wherein the audio, video and textual collaboration services further include a service to monitor a quality metric for an established audio, video or textual collaboration between a user of a client computer and a user of an agent computer, and to transition the established audio, video or textual collaboration from one audio, video, textual collaboration manner to another when it is determined that the quality metric has reached a predetermined threshold.

21. The method of claim 10, wherein execution of the selected audio, video or textual collaboration service of (d) comprises monitoring a quality metric for an established audio, video or textual collaboration between a user of a client computer and a user of an agent computer, and transitioning the established audio, video or textual collaboration from one audio, video or textual collaboration manner to another when it is determined that the quality metric has reached a predetermined threshold.

22. The method of claim 21, wherein said monitoring and transitioning comprises transitioning a text only manner of collaboration to a collaboration manner that includes audio exchanges between the two users when the quality metric reaches a predetermined threshold denoting sufficient bandwidth available to accommodate the audio exchanges.

23. The method of claim 21, wherein said monitoring and transitioning comprises transitioning an audio only manner of collaboration to a collaboration manner that includes still image exchanges between the two users when the quality metric reaches a predetermined threshold denoting sufficient bandwidth available to accommodate the still image exchanges.

24. The method of claim 21, wherein said monitoring and transitioning comprises transitioning a still image telephony only manner of collaboration to a collaboration manner that includes video telephony between the two users when the quality metric reaches a predetermined threshold denoting sufficient bandwidth available to accommodate the video.

25. The method of claim 21, wherein said monitoring and transitioning comprises transitioning a manner of collaboration that includes video telephony to a still image telephony only manner of collaboration between the two users when the quality metric drops to a predetermined minimum threshold.

26. The method of claim 21, wherein said monitoring and transitioning comprises transitioning a manner of collaboration that includes still image telephony to an audio telephony only manner of collaboration between the two users when the quality metric drops to a predetermined minimum threshold.

27. The method of claim 21, wherein said monitoring and transitioning comprises transitioning a manner of collaboration that includes audio telephony to a text only manner of collaboration between the two users when the quality metric drops to a predetermined minimum threshold.

28. The method of claim 21, wherein said monitoring and transitioning comprises replacing a packet based telephony connection between a client computer and the bridge server via a data network with a direct switch based telephony connection between the client computer and the bridge server when the quality metric drops to a predetermined minimum threshold.

29. The bridge server of claim 7, wherein the monitor and transition service includes a service to transition a text only manner of collaboration to a collaboration manner that includes audio exchanges between the two users when the quality metric reaches a predetermined threshold denoting sufficient bandwidth available to accommodate the audio exchanges.

30. The bridge server of claim 7, wherein the monitor and transition service include a service to transition an audio only manner of collaboration to a collaboration manner that includes still image exchanges between the two users when the quality metric reaches a predetermined threshold denoting sufficient bandwidth available to accommodate the still image exchanges.

31. The bridge server of claim 7, wherein the monitor and transition service includes a service to transition a still image telephony only manner of collaboration to a collaboration manner that includes video telephony between the two users when the quality metric reaches a predetermined threshold denoting sufficient bandwidth available to accommodate the video.

32. The bridge server of claim 7, wherein the monitor and transition service includes a service to transition a manner of collaboration that includes video telephony to a still image telephony only manner of collaboration between the two users when the quality metric drops to a predetermined minimum threshold.

33. The bridge server of claim 7, wherein the monitor and transition service includes a service to transition a manner of collaboration that includes still image telephony to an audio telephony only manner of collaboration between the two users when the quality metric drops to a predetermined minimum threshold.

34. The bridge server of claim 7, wherein the monitor and transition service include a service to transition a manner of collaboration that includes audio telephony to a text only manner of collaboration between the two users when the quality metric drops to a predetermined minimum threshold.

35. The bridge server of claim 7, wherein the monitor and transition service includes a service to replace a packet based telephony connection between a client computer and the bridge server via a data network with a direct switch based telephony connection between the client computer and the bridge server when the quality metric drops to a predetermined minimum threshold.

* * * * *